United States Patent
Buss et al.

(10) Patent No.: US 6,571,544 B1
(45) Date of Patent: Jun. 3, 2003

(54) CUTTING IMPLEMENT HAVING NOTCHED FRONT FLOW BAFFLE

(75) Inventors: Steven Henry Buss, Horicon, WI (US); Todd Lynn Smith, Beaver Dam, WI (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 09/902,528

(22) Filed: Jul. 9, 2001

(51) Int. Cl.[7] .............................................. A01B 67/00
(52) U.S. Cl. ...................................... 56/320.1; 56/17.4
(58) Field of Search ................................. 56/16.7, 17.4, 56/17.5, 13.7, 13.8, 255, 295, 320.1, 320.2, 502, 503

(56) References Cited

U.S. PATENT DOCUMENTS

| | | | |
|---|---|---|---|
| 3,673,772 A | 7/1972 | Holzhei | 56/13.1 |
| 3,851,452 A | 12/1974 | Brocas | |
| 4,502,271 A | 3/1985 | Hansen et al. | |
| 4,543,773 A | 10/1985 | Reilly | |
| 5,191,756 A | 3/1993 | Kuhn | 56/17.5 |
| 5,267,429 A | 12/1993 | Kettler et al. | 56/295 |
| 5,457,947 A | * 10/1995 | Samejima et al. | 56/16.7 |
| 5,483,790 A | 1/1996 | Kuhn et al. | 56/17.5 |
| 5,488,821 A | 2/1996 | McCunn et al. | 56/320.2 |
| 5,609,011 A | 3/1997 | Kuhn et al. | 56/17.5 |
| 5,765,346 A | 6/1998 | Benter et al. | 56/2 |
| 5,845,475 A | 12/1998 | Busboom et al. | |
| 5,860,272 A | 1/1999 | Griffin | 56/320.1 |
| 5,884,466 A | 3/1999 | Willmering et al. | |
| 5,921,072 A | 7/1999 | Cargile | |
| 5,987,863 A | 11/1999 | Busboom et al. | 56/320.1 |
| 6,038,840 A | 3/2000 | Ishimori et al. | |
| 6,065,276 A | 5/2000 | Hohnl et al. | |
| 6,189,307 B1 | 2/2001 | Buss et al. | |
| 6,192,666 B1 | 2/2001 | Sugden et al. | |

FOREIGN PATENT DOCUMENTS

| | | |
|---|---|---|
| DE | 295 12 057 | 7/1995 |
| EP | 1 186 221 | 3/2002 |
| FR | 2 548 864 | 1/1985 |
| FR | 2 643 213 | 8/1990 |
| GB | 2 347 838 | 9/2000 |
| JP | 1 010913 | 1/1989 |

OTHER PUBLICATIONS

Copies of nine (9) photographs of baffles used with mower decks manufactured by John Deere, photographs taken by a Deere and Company employee in Jun. and Oct. 2001 in U.S.A.

* cited by examiner

*Primary Examiner*—Robert E. Pezzuto

(57) ABSTRACT

A tractor having a cutting implement including an attached baffle is provided. The baffle assists as a shield to substantially reduce the amount of vegetation and other debris that may leave or escape the implement. Additionally, the baffle creates an area within the perimeter of the implement in which grass and other vegetation that is to be cut by the blades has an opportunity to straighten after being knocked down by the tractor's tire and prior to being cut by its blades. Accordingly, the baffle assists in maintaining the overall appearance of one's grounds after they have been cut and permits the implement to deliver an increased level of overall cutting performance.

7 Claims, 6 Drawing Sheets

CUTTING IMPLEMENT HAVING NOTCHED FRONT FLOW BAFFLE

FIELD OF THE INVENTION

This invention relates to tractor cutting implements having multiple cutting chambers, and more specifically, to structure for permitting vegetation that has been flattened by at least one wheel of a tractor to be adequately cut by the implement.

BACKGROUND OF THE INVENTION

Cutting implements or decks which are usable with lawn and garden tractors and which have multiple cutting chambers are typically constructed with skirts or walls which extend downwardly from the top surfaces of these decks. These skirts are provided, in large part, to retain a substantial portion of the vegetation that is cut, as well as the debris that is disturbed, from escaping from the inside(s) of the chamber (s). When constructed, however, these skirts are often manufactured to be higher at the fronts of the decks than they are at the rear portions thereof. As a result, the cutting plane of the blade carried within a particular chamber falls below the lowest portion of the front of a particular deck, thereby leaving an open gap. With this type of construction, a number of difficulties have been created.

Specifically, at least two difficulties relating to the manufacture of the above constructed decks have been noticed. First, because the skirt is higher at the front of the deck than it is at the rear thereof, grass and other debris is sometimes thrown from underneath the far left chamber. This results since the cutting plane of the blade therein is slightly below the front of that chamber. Accordingly, when using a deck with this type of skirt, one is left with an unpleasing appearance of cut vegetation or debris that has been thrown on freshly cut grounds. Additionally, this vegetation or debris is also thrown from the underside of the deck and settles on top of the deck. Settlement of such debris often causes an unwanted appearance of an operator's equipment. Thus, it would be beneficial to provide structure that substantially reduces the escape of materials that have been cut so as to increase the overall appearance of those grounds and equipment.

Second, past designs of implements which have addressed the gap described above have sought to use a baffle which extends across the front edge of the deck. Providing this type of baffle has caused difficulty with the mowing or cutting quality that is obtainable from the deck. This difficulty has existed since implements of the type described are often carried at the middle of the tractor. With this arrangement, the two front wheels and tires of the tractor precede the implement and therefore knock or mat down a strip of grass corresponding to the width of the tire. The difficulty that arises, then, is an inability of the grass to have an opportunity to stand back up or straighten and be adequately cut by the blade(s) since the skirt further knocks over the grass just prior to when it is supposed to meet those blades. This difficulty becomes highlighted when air and vegetation moved by the blade also flattens that vegetation or grass in the area of, particularly, the left front tire. This area is of specific concern since a clockwise rotation of the deck's blades will begin the flow of air and vegetation within the deck in the left hand chamber. In this case, vegetation or grass that has been run over by a tractor's left front tire has little time to stand back up prior to being pressed down for a second time by the beginning portion of the chamber's flow across the wheel's path. As a consequence, the blade(s) are unable to lift or raise the grass to allow it to be properly cut.

Thus, it would be beneficial to provide a device that is configured and positioned on the deck to permit the vegetation an opportunity to straighten and be properly cut. Further, it would also be beneficial to provide such a device with an added ability to shield, and thus substantially reduce the amount of vegetation that leaves the deck so as to insure the overall appearance of grounds that have been mowed or cut.

SUMMARY OF THE INVENTION

Accordingly, there is provided a device mounted with a tractor cutting implement or deck. The device controls and substantially reduces the throwing of vegetation from the underside of, particularly, the far left chamber. Further, the device permits the deck to deliver a desirable level of cut quality.

To substantially reduce the amount of vegetation and other debris that leaves the far left chamber and portions of the center chamber of the deck, the device takes the form of a baffle, preferably constructed as an elongated metal strip. While a vast amount of debris thrown from the blades ordinarily impacts the inside of the deck's skirt, the baffle reduces that amount of debris and therefore the amount of debris likely to escape the deck. To do this, it is positioned to extend downwardly from the top surfaces of the insides of the left and center cutting chambers to a point that is slightly above the cutting plane of the left and center blades. With this positioning, vegetation that is impacted by the blade(s) is thrown from their respective edge(s) and is substantially shielded from leaving the underside of those chambers.

To obtain the level of cut quality that can be delivered by the deck, the baffle has been positioned inwardly from the front edge thereof and extends or spans across portions of at least two chambers of the deck. Positioning of the deck at such a location creates a void or non-turbulent area in front of the baffle that allows the vegetation that has been knocked down by the front edge of the deck to straighten prior to meeting and being cut by the left blade. Additionally, extension of the baffle between the two chambers permits the beginning flow of air and vegetation in the deck to be more adequately and quickly conveyed through it.

Additionally, the baffle is provided with a notch. The notch is located on the baffle in a manner that allows it to be aligned with and of the same width as the left front tire of the tractor. Further, the notch provides a higher vertical distance, measured from either the cutting plane or the bottom of the baffle, which allows for additional space that will be needed for grass that has been pressed down by the tractor's tire to straighten. Consequently, grass and other such vegetation that has been knocked down by that tire is given an opportunity to stand back up and then be lifted or raised so that it can be cut by the left and center blades.

Thus, there is provided a device in the form of a baffle which assists in shielding, and therefore substantially reducing the amount of vegetation and other debris from leaving the underside of the left cutting chamber, and thus the deck, after that material has been impacted by the cutting blade. Additionally, there has been provided a baffle which permits an operator to obtain a desirable level of cut quality from the cutting deck.

DESCRIPTION OF THE PREFERRED EMBODIMENT

Figure 1:
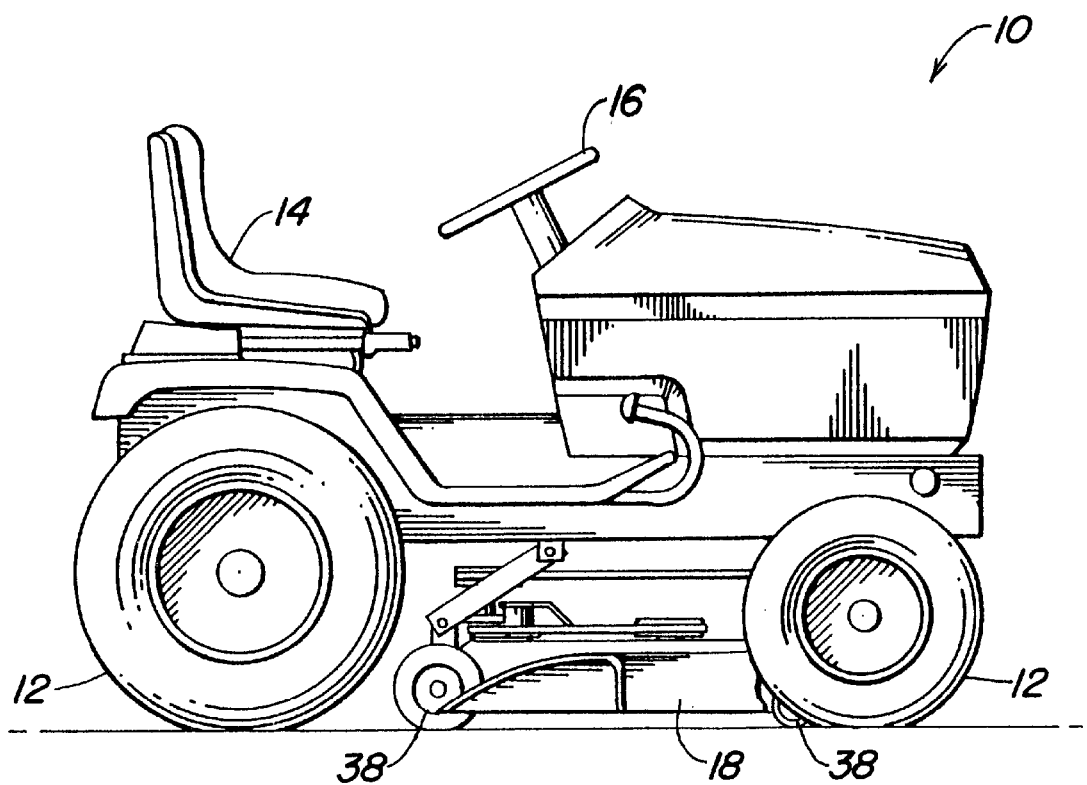
FIG. 1 is a side view of a lawn and garden tractor having an implement in the form of a cutting deck mounted at its mid-portion.

Looking to FIG. 1, there is provided a lawn and garden tractor 10 supported upon a plurality of ground engaging wheels 12, a seat 14 and a steering wheel 16 located in front thereof. Further included as part of the tractor is a multi-chamber cutting implement or deck 18 mounted to the middle thereof.

Figure 2:
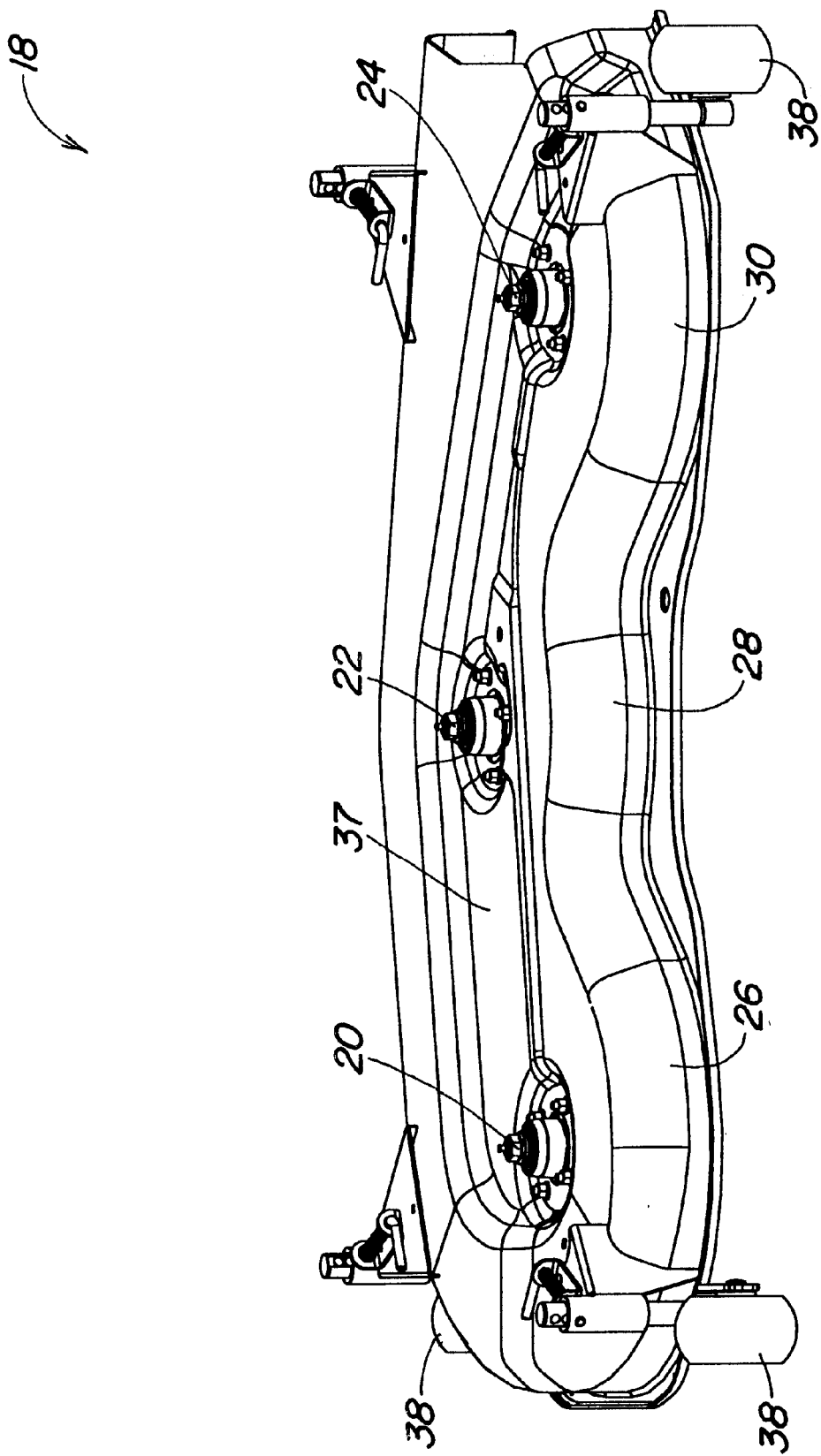
FIG. 2 is a rear perspective view of the deck shown in FIG. 1.
Figure 4:
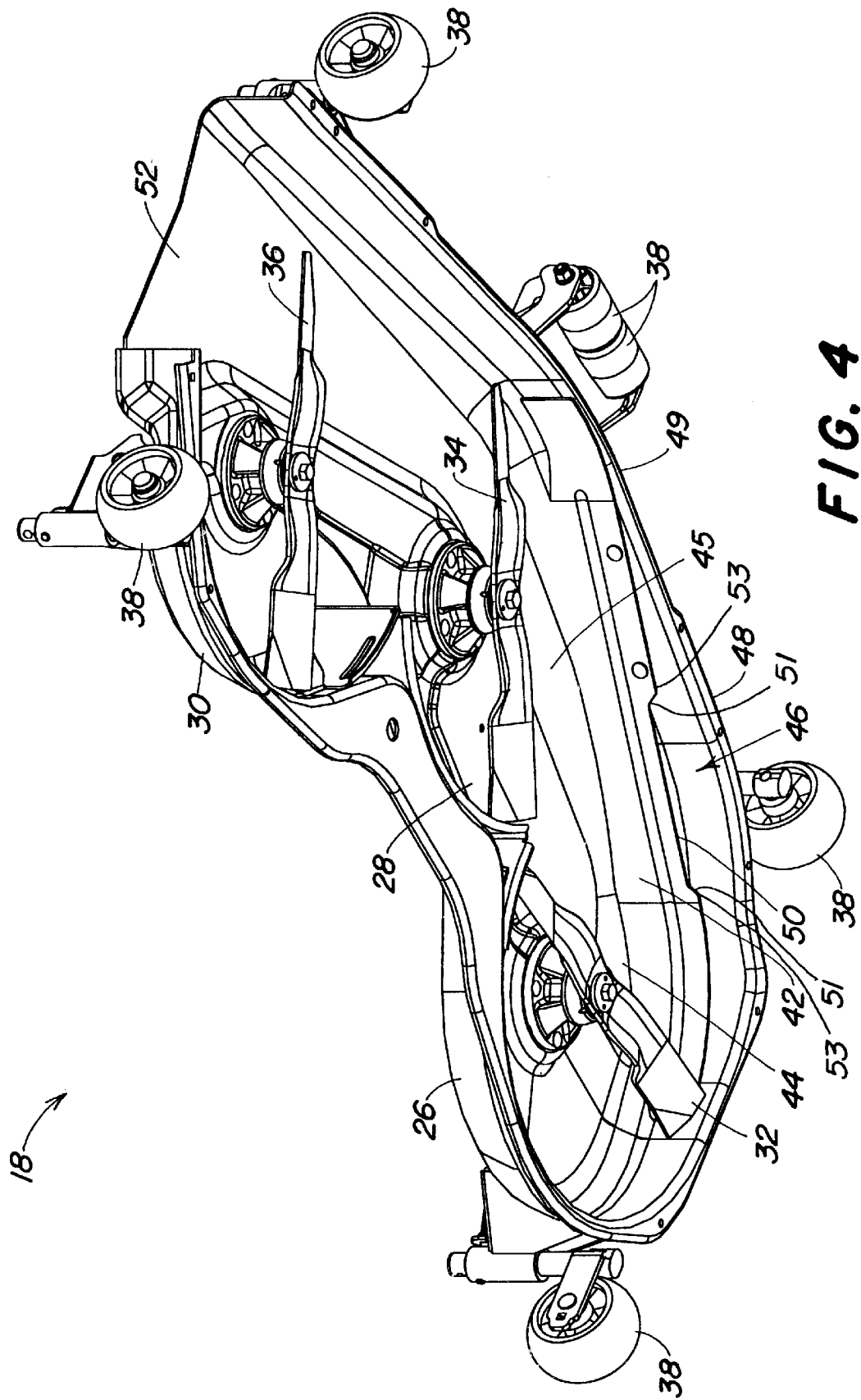
FIG. 4 is a side and elevated perspective view of the underside of the cutting deck showing the relative positioning of the cutting plane of the left and center blades to the baffle.

FIG. 2 more closely illustrates the cutting deck 18 that is shown attached to the tractor 10 of FIG. 1. The deck 18 includes three cutting spindles 20, 22 and 24 that are mounted with three cutting chambers 26, 28 and 30, respectively oriented from left to right, which each house or enclose a blade 32, 34 or 36 respectively therein under a top surface 37 of the deck 18, as shown in FIGS. 2 and 4. Attached to the front and each of the four corner areas of the deck are anti-scalp wheels 38 mounted with a wall or skirt 39 depending from the top surface 37. The wheels 38 are used to carry the deck 18 over unexpected changes in elevation in the ground that is traveled by the tractor 10.

Figure 3:
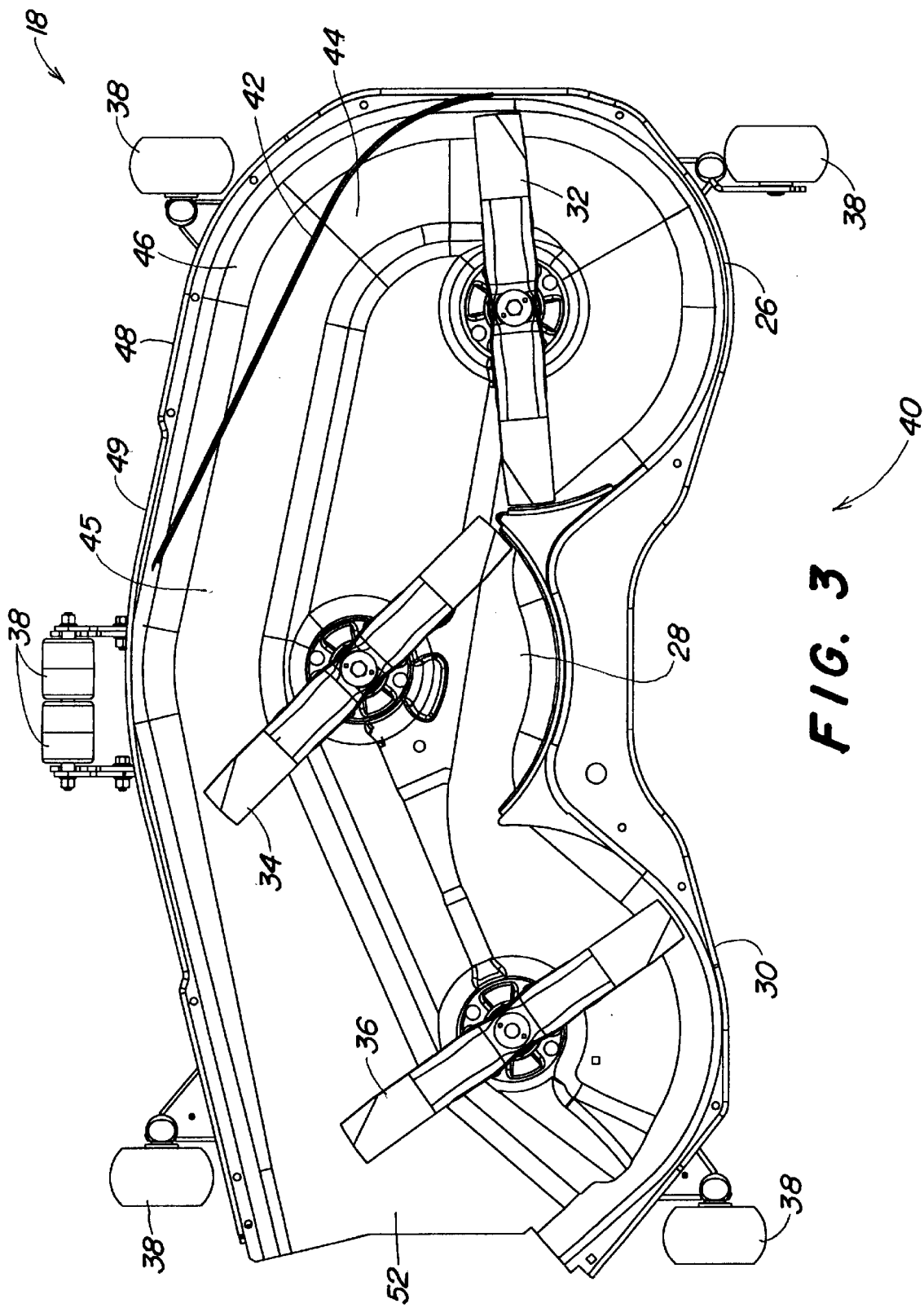
FIG. 3 is a perspective view of the underside of the cutting deck wherein the deck includes the baffle of the present invention.
Figure 5:
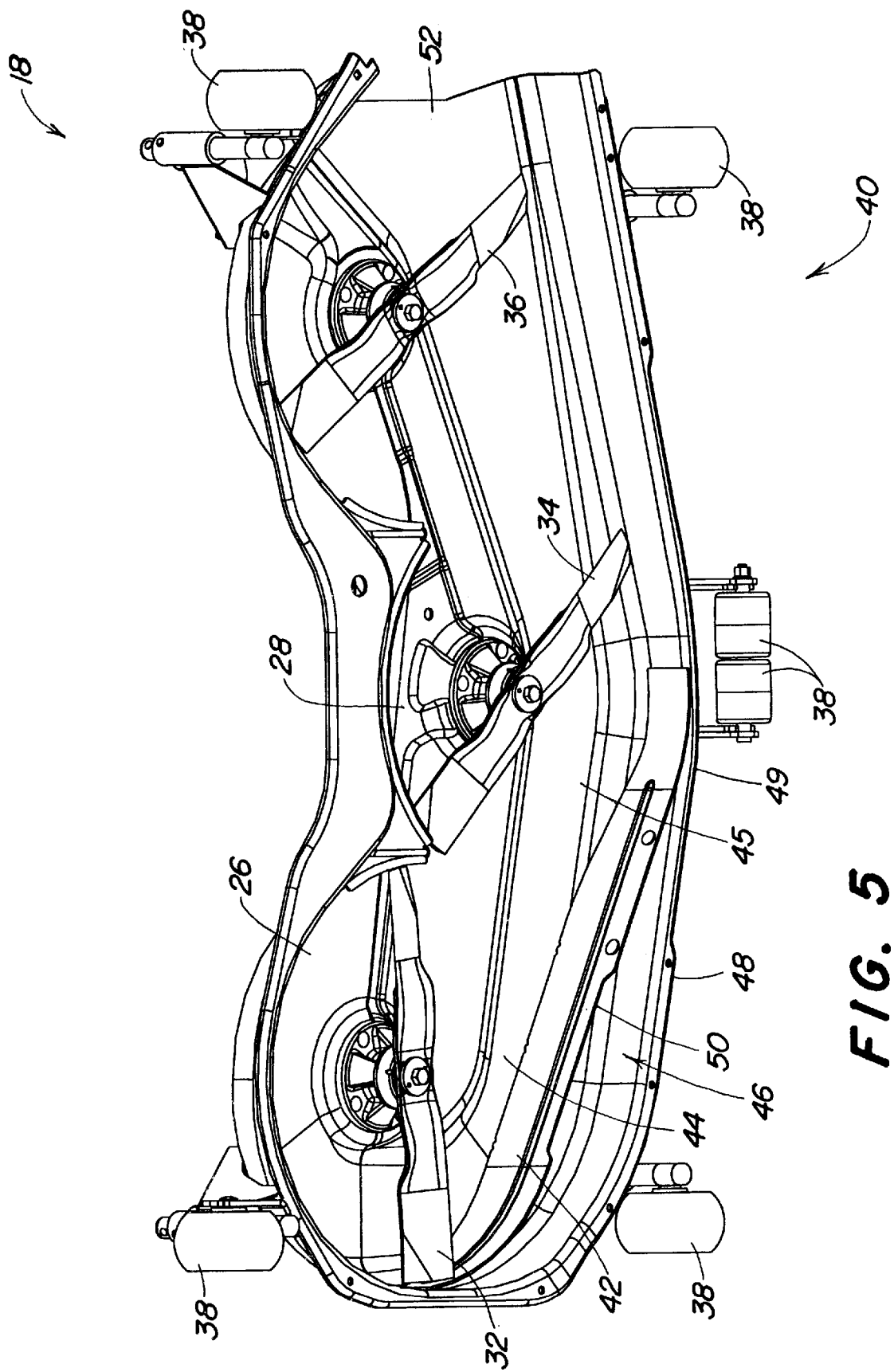
FIG. 5 is an elevated perspective view of the underside of the cutting deck.

Looking now to FIGS. 3–5, the deck 18 is shown to expose its underside 40. There, a baffle 42 in the form of an elongated strip which assists in preventing debris such as cut vegetation as well as rocks and/or stones from leaving the underside 40 of the deck 18. As shown in FIG. 4, the baffle 42 extends downwardly from the top surface 44, 45 of the inside of the left and center chambers 26, 28, respectively, and extends to a point that is slightly above the cutting plane of the blade and which is slightly higher than the front of the deck 18. Vegetation and debris which escapes past the baffle 42 is deflected downwardly upon contact with the inside of the deck 18.

Figure 6:
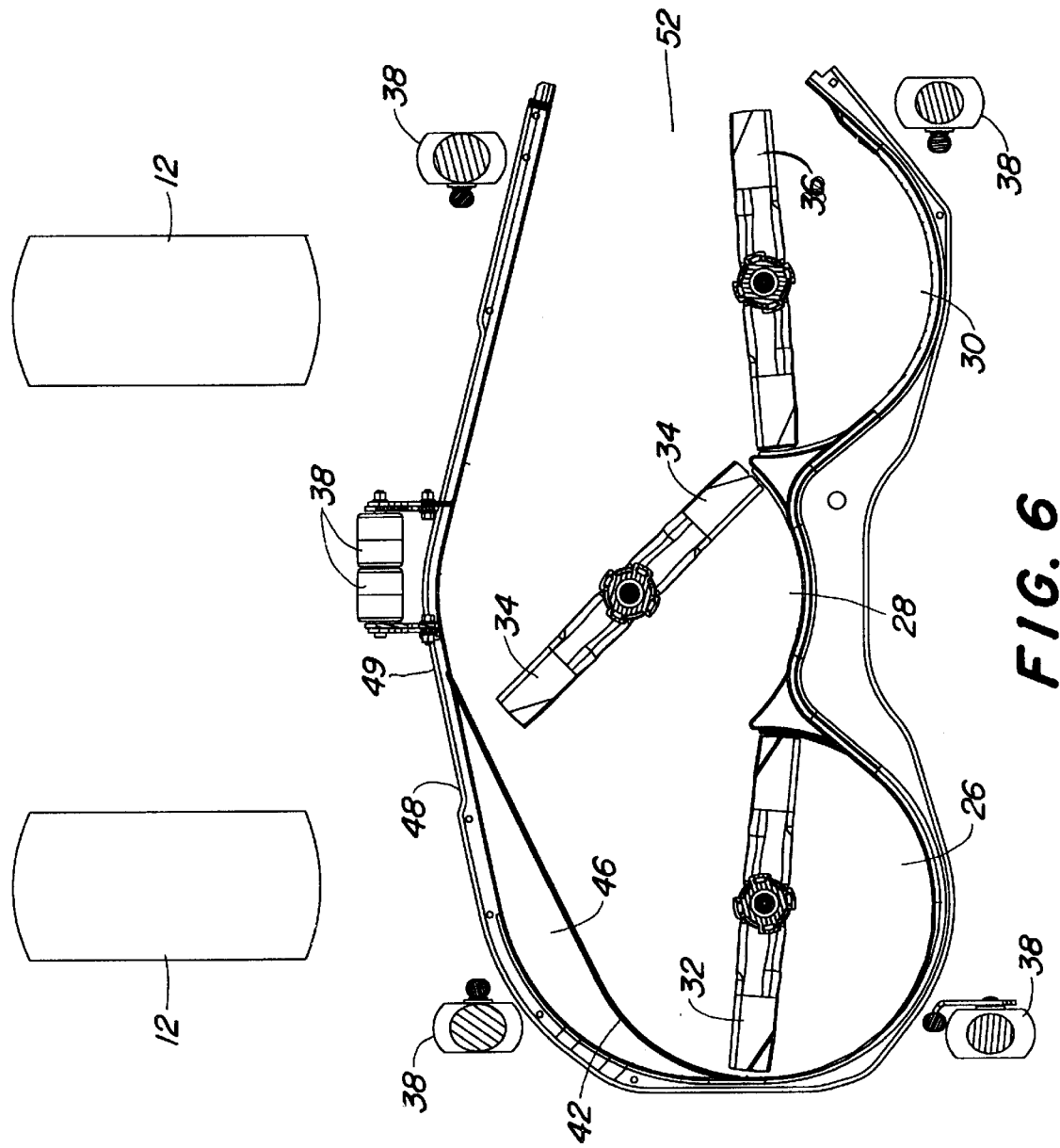
FIG. 6 is a perspective view of the underside of the cutting deck relative to placement of the left and right front wheel and tire of the tractor to which the implement of the present invention is attached.

Additionally, positioning of the baffle 42 at the location seen in FIGS. 5 and 6 assists in the cutting of grass and other vegetation that is to be impacted by the respective blades 32, 34 of the left and center chambers 26 and 28. Cutting of this vegetation and the effectiveness thereof is assisted by a void or open and unobstructed area 46 that is created immediately before the baffle 42 at the leading front edges 48, 49 of the left and center chambers 26 and 28, respectively, as shown most clearly in FIG. 5. With construction of the void 46, vegetation that has been knocked down by the edges 48, 49 of the left and center chambers 26, 28 is allowed a chance to stand back up prior to its meeting with the blades 32, 34. This is due to the ability of the strip 42 to create the void 46 beyond the front edges 48,49 thereby allowing that area to be substantially free of the movement of air and vegetation caused by rotation of the left blade 32. Upon passing beyond this area 46, the grass is more straightened whereby only its uppermost portion may be touched by the baffle 42, thereby generally leaving the lower and mid-portion of the grass to remain upright at the cutting plane where it is impacted by the left blade 32. Consequently, the blades 32, 34 are more able than they have previously been to lift or raise the vegetation so that it may obtain a stance or position enabling the blade(s) to slice it and thereby obtain a desirable level of cut quality.

As shown throughout FIGS. 4–5, the baffle 42 also contains a depression or notch 50. As shown in FIG. 4, the notch 50 is defined by several upwardly sloped or inclined portions 51 relative to an adjacent edge 53 of the baffle 42. The notch 50 provides added vertical space whereby vegetation or grass that has been knocked down by the left front wheel and tire 12 of the tractor 10 is permitted additional room and time to straighten. With its ability to straighten, the vegetation may then be adequately lifted and cut by the blades. After being lifted and cut, the vegetation is then swept along the baffle 42 and through the right chamber 30 to a discharge opening 52 where it then leaves the deck 18.

Thus, there is provided a device in the form of a baffle 42 that further assists in shielding debris from being projected from the underside 40 of the cutting deck 18. In providing this shielding, an operator of a tractor having an implement of the type just described will be able to substantially insure a cleaner appearance of his/her grounds and improve upon the overall cutting performance that is obtainable from the implement.

Having described the preferred embodiment, it will become apparent that various modifications can be made without departing from the scope of the invention as defined in the accompanying claims.

We claim:

1. A cutting implement usable with a vehicle, the implement comprising:
   a) a top surface;
   b) a downwardly depending wall extending from the top surface to substantially define a plurality of cutting chambers which each contain a cutting blade therein; and
   c) a baffle mounted within the chambers for shielding vegetation and other debris contacted by the blades from exiting the implement, the baffle being arcuately shaped so as to extend across a portion of one and at least another of the plurality of chambers to provide a contour along which cut vegetation may be smoothly and quickly conveyed through the implement, the baffle comprising a depression, the depression being defined by several generally sloped portions and a generally straightened portion, the straightened portion being positioned between the sloped portions.

2. The implement as recited in claim 1 wherein:
   the depression is centrally located along the bottom edge of the baffle.

3. The implement as recited in claim 1 wherein:
   the depression is alignable with the left front wheel of the vehicle.

4. The implement as recited in claim 3 wherein:
   the baffle is mounted with the one and the at least another chamber at a distance from a front edge of each of those chambers to create an open and unobstructed area extending from those edges to the baffle so as to permit vegetation contacted by the implement to straighten before meeting the cutting blades thereof.

5. The implement as recited in claim 1 wherein:
   the baffle is mounted with the one and the at least another chamber at a distance from a front edge of each thereof to create and open and unobstructed area extending from those respective front edges to the baffle.

6. The implement recited in claim 5 wherein:

the depression is a notch that is alignable with and dimensioned to be of substantially the same width as a tire of a vehicle on which the implement is carried.

7. The implement recited in claim 1 wherein:

the depression is a notch that is alignable with and dimensioned to be of substantially the same width as a tire of a vehicle on which the implement is carried.

* * * * *